(12) United States Patent
Tokuda (10) Patent No.: US 10,352,803 B2
(45) Date of Patent: Jul. 16, 2019

(54) PRESSURE SENSOR CHIP (71) Applicant: Azbil Corporation, Chiyoda-ku (JP)

(72) Inventor: Tomohisa Tokuda, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 226 days.

(21) Appl. No.: 15/300,578

(22) PCT Filed: Mar. 9, 2015

(86) PCT No.: PCT/JP2015/056836
§ 371 (c)(1),
(2) Date: Sep. 29, 2016

(87) PCT Pub. No.: WO2015/151731
PCT Pub. Date: Oct. 8, 2015

(65) Prior Publication Data
US 2017/0176277 A1 Jun. 22, 2017

(51) Int. Cl.
*G01L 13/02* (2006.01)
*G01L 9/00* (2006.01)
*G01L 19/06* (2006.01)

(52) U.S. Cl.
CPC .......... *G01L 13/025* (2013.01); *G01L 9/0052* (2013.01); *G01L 9/0054* (2013.01); *G01L 9/0073* (2013.01); *G01L 13/02* (2013.01); *G01L 19/0618* (2013.01)

(58) Field of Classification Search
CPC ... G01L 13/025; G01L 9/0052; G01L 9/0054; G01L 13/02
See application file for complete search history.

(56) References Cited

U.S. PATENT DOCUMENTS 7,360,431 B2   4/2008  Yoneda et al.
2006/0272422 A1*  12/2006  Yoneda ............... G01L 19/0618
                                                    73/724

(Continued)

FOREIGN PATENT DOCUMENTS

EP    1394522 A2 *  3/2004  ......... G01L 19/0645
JP    3847281 B2 * 11/2006  ......... G01L 19/0618

(Continued)

OTHER PUBLICATIONS

International Search Report dated Mar. 31, 2015, in PCT/JP2015/056836 filed Mar. 9, 2015.

*Primary Examiner* — Jamel E Williams
(74) *Attorney, Agent, or Firm* — Oblon, McClelland, Maier & Neustadt, L.L.P.

(57) ABSTRACT

A pressure sensor chip according to the present invention includes an annular diaphragm that surrounds a periphery of a low-differential-pressure diaphragm (1) as a high-differential-pressure diaphragm (2). A measurement pressure (Pa) for one surface of the low-differential-pressure diaphragm (1) is transmitted to one surface of the high-differential-pressure diaphragm (2) along a branched path, and a measurement pressure (Pb) for the other surface of the low-differential-pressure diaphragm (1) is transmitted to the other surface of the high-differential-pressure diaphragm (2) along a branched path. Thus, multiple differential-pressure measurement ranges can be provided.

7 Claims, 9 Drawing Sheets (56) References Cited

U.S. PATENT DOCUMENTS

| | | | | |
|---|---|---|---|---|
| 2010/0281991 A1* | 11/2010 | Seeberg | ................ | G01L 13/028 |
| | | | | 73/716 |
| 2012/0006129 A1* | 1/2012 | Tokuda | ................ | G01L 19/147 |
| | | | | 73/862.629 |
| 2013/0239694 A1* | 9/2013 | Seto | ...................... | G01L 13/025 |
| | | | | 73/720 |
| 2014/0137652 A1* | 5/2014 | Tokuda | ................ | G01L 13/025 |
| | | | | 73/715 |
| 2014/0144243 A1* | 5/2014 | Tanaka | ................ | G01L 13/025 |
| | | | | 73/716 |
| 2014/0157905 A1* | 6/2014 | Tokuda | ................ | G01L 9/0051 |
| | | | | 73/715 |
| 2015/0330854 A1* | 11/2015 | Tsushima | .............. | G01L 13/026 |
| | | | | 73/717 |

FOREIGN PATENT DOCUMENTS

| | | | | | |
|---|---|---|---|---|---|
| JP | 2013130453 | A | * | 7/2013 | |
| KR | 101532143 | B1 | * | 6/2015 | ........... G01L 13/026 |

* cited by examiner

PRESSURE SENSOR CHIP

TECHNICAL FIELD

The present invention relates to pressure sensor chips including a sensor diaphragm that outputs a signal corresponding to the difference between pressures applied to one and the other surfaces of the sensor diaphragm. An example of such a pressure sensor chip includes a thin plate-shaped diaphragm, which is displaced when a pressure is applied thereto, and a strain resistance gauge formed on the diaphragm. The pressure sensor chip detects the pressure applied to the diaphragm on the basis of a change in the resistance of the strain resistance gauge formed on the diaphragm.

BACKGROUND ART

Differential pressure sensors including built-in pressure sensor chips, which include a sensor diaphragm that outputs a signal corresponding to the difference between pressures applied to one and the other surfaces of the sensor diaphragm, have been used as industrial differential pressure sensors.

Such a differential pressure sensor is structured so that measurement pressures applied to high-pressure-side and low-pressure-side pressure-receiving diaphragms are transmitted to one and the other surfaces of the sensor diaphragm by enclosed liquid that serves as a pressure transmitting medium. Strain of the sensor diaphragm is detected as, for example, a change in resistance of a strain resistance gauge, and the resistance change is converted into an electrical signal to be output.

A differential pressure/static pressure composite sensor is an example of a differential pressure sensor capable of measuring not only a differential pressure but also a static pressure. The differential pressure/static pressure composite sensor includes a differential-pressure diaphragm formed in a central region of a substrate and an annular static-pressure diaphragm that surrounds the outer periphery of the differential-pressure diaphragm (see, for example, PTL 1). The differential pressure/static pressure composite sensor is capable of detecting not only a differential pressure but also a static pressure by transmitting a measurement pressure applied to one or the other surface of the differential-pressure diaphragm to one surface of the static-pressure diaphragm along a branched path and applying a reference pressure to the other surface of the static-pressure diaphragm.

CITATION LIST

Patent Literature

PTL 1: Japanese Unexamined Patent Application Publication No. 2010-91384

SUMMARY OF INVENTION

Technical Problem

The sensitivity and withstand pressure of this type of sensor are determined by the aspect ratios of the diaphragms, and therefore multiple measurement ranges can be obtained by changing the aspect ratios. Accordingly, in general, the above-described differential pressure/static pressure composite sensor (multivariable differential pressure/static pressure sensor) can be realized by mounting diaphragms having different aspect ratios, that is, different ranges, on a single chip. However, in this type of sensor, it is difficult to provide multiple differential-pressure measurement ranges, and multi-range differential pressure sensors have not yet been realized.

An object of the present invention is to provide a pressure sensor chip having multiple differential-pressure measurement ranges.

Solution to Problem

A pressure sensor chip according to the present invention includes a substrate; a sensor diaphragm of a first type that is formed in a central region of the substrate and that outputs a signal corresponding to a difference between pressures applied to one surface and the other surface of the sensor diaphragm of the first type; a sensor diaphragm of a second type that is formed on the substrate so as to be apart from the sensor diaphragm of the first type, the sensor diaphragm of the second type outputting a signal corresponding to a difference between pressures applied to one surface and the other surface of the sensor diaphragm of the second type; first and second holding members that are bonded to one surface and the other surface of the substrate in such a manner that the first and second holding members face each other with the sensor diaphragm of the second type disposed therebetween; a first pressure introduction hole provided in the first holding member to transmit a first measurement pressure to the one surface of the sensor diaphragm of the first type; a second pressure introduction hole provided in the second holding member to transmit a second measurement pressure to the other surface of the sensor diaphragm of the first type; a first recess provided in the first holding member to prevent the sensor diaphragm of the first type from being excessively displaced when an excessive pressure is applied to the sensor diaphragm of the first type; a second recess provided in the second holding member to prevent the sensor diaphragm of the first type from being excessively displaced when an excessive pressure is applied to the sensor diaphragm of the first type; a first chamber provided in a peripheral portion of the first holding member as a space that faces the one surface of the sensor diaphragm of the second type, one of the first measurement pressure for the one surface of the sensor diaphragm of the first type and the second measurement pressure for the other surface of the sensor diaphragm of the first type being transmitted to the first chamber; and a second chamber provided in a peripheral portion of the second holding member as a space that faces the other surface of the sensor diaphragm of the second type, the other of the first measurement pressure for the one surface of the sensor diaphragm of the first type and the second measurement pressure for the other surface of the sensor diaphragm of the first type being transmitted to the second chamber.

Advantageous Effects of Invention

According to the present invention, multiple differential-pressure measurement ranges can be provided by outputting a pressure difference obtained by the sensor diaphragm of the first type as a low-range differential pressure and a pressure difference obtained by the sensor diaphragm of the second type as a high-range differential pressure.

DESCRIPTION OF EMBODIMENTS

A pressure sensor chip according to the present invention will now be described.

A pressure sensor chip according to the present invention includes a substrate; a sensor diaphragm of a first type that is formed in a central region of the substrate and that outputs a signal corresponding to a difference between pressures applied to one surface and the other surface of the sensor diaphragm of the first type; a sensor diaphragm of a second type that is formed on the substrate so as to be apart from the sensor diaphragm of the first type, the sensor diaphragm of the second type outputting a signal corresponding to a difference between pressures applied to one surface and the other surface of the sensor diaphragm of the second type; first and second holding members that are bonded to one surface and the other surface of the substrate in such a manner that the first and second holding members face each other with the sensor diaphragm of the second type disposed therebetween; a first pressure introduction hole provided in the first holding member to transmit a first measurement pressure to the one surface of the sensor diaphragm of the first type; a second pressure introduction hole provided in the second holding member to transmit a second measurement pressure to the other surface of the sensor diaphragm of the first type; a first recess provided in the first holding member to prevent the sensor diaphragm of the first type from being excessively displaced when an excessive pressure is applied to the sensor diaphragm of the first type; a second recess provided in the second holding member to prevent the sensor diaphragm of the first type from being excessively displaced when an excessive pressure is applied to the sensor diaphragm of the first type; a first chamber provided in a peripheral portion of the first holding member as a space that faces the one surface of the sensor diaphragm of the second type, one of the first measurement pressure for the one surface of the sensor diaphragm of the first type and the second measurement pressure for the other surface of the sensor diaphragm of the first type being transmitted to the first chamber; and a second chamber provided in a peripheral portion of the second holding member as a space that faces the other surface of the sensor diaphragm of the second type, the other of the first measurement pressure for the one surface of the sensor diaphragm of the first type and the second measurement pressure for the other surface of the sensor diaphragm of the first type being transmitted to the second chamber.

In the pressure sensor chip according to the present invention, the first measurement pressure is transmitted to the one surface of the sensor diaphragm of the first type, and the second measurement pressure is transmitted to the other surface of the sensor diaphragm of the first type. Accordingly, the sensor diaphragm of the first type outputs a signal corresponding to the difference between the first measurement pressure and the second measurement pressure. One of the first measurement pressure for the one surface of the sensor diaphragm of the first type and the second measurement pressure for the other surface of the sensor diaphragm of the first type is transmitted to the one surface of the sensor diaphragm of the second type. The other of the first measurement pressure for the one surface of the sensor diaphragm of the first type and the second measurement pressure for the other surface of the sensor diaphragm of the first type is transmitted to the other surface of the sensor diaphragm of the second type. Accordingly, the sensor diaphragm of the second type outputs a signal corresponding to the difference between the first measurement pressure and the second measurement pressure. Thus, in the pressure sensor chip according to the present invention, the sensor diaphragm of the first type constitutes a first differential pressure sensor that detects the difference between the first measurement pressure and the second measurement pressure, and the sensor diaphragm of the second type constitutes a second differential pressure sensor that detects the difference between the first measurement pressure and the second measurement pressure.

In the pressure sensor chip according to the present invention, in the case where the pressure sensitivity of the sensor diaphragm of the second type is lower than the pressure sensitivity of the sensor diaphragm of the first type, the pressure difference obtained by the sensor diaphragm of the first type can be output as a low-range differential pressure, and the pressure difference obtained by the sensor diaphragm of the second type can be output as a high-range differential pressure. More specifically, when a low differential pressure is applied, the differential pressure can be accurately measured by the sensor diaphragm of the first type. When a high differential pressure is applied, the differential pressure can be accurately measured by the sensor diaphragm of the second type. Thus, multiple differential-pressure measurement ranges can be provided.

Although an excessive pressure is applied to the sensor diaphragm of the first type when a high differential pressure is applied, the sensor diaphragm of the first type does not break because the recesses for preventing the sensor diaphragm of the first type from being excessively displaced are formed in the first holding member and the second holding member.

Pressure sensor chips according to embodiments of the present invention will now be described in detail with reference to the drawings.

[Embodiment 1]

Figure 1:
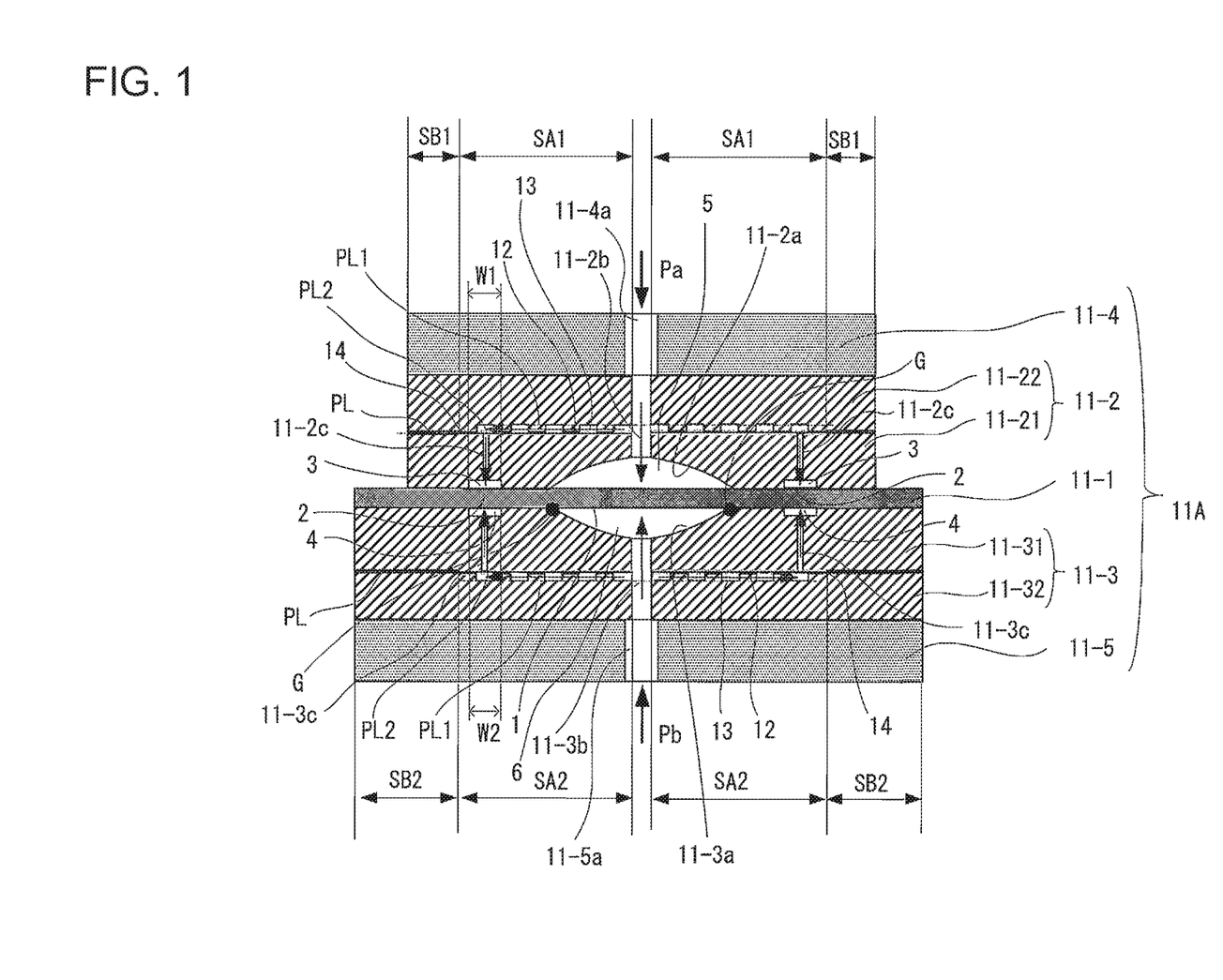
FIG. 1 is a schematic diagram illustrating a pressure sensor chip according to a first embodiment of the present invention (Embodiment 1).

FIG. 1 is a schematic diagram illustrating a pressure sensor chip according to a first embodiment of the present invention (Embodiment 1). FIG. 1 illustrates a substrate 11-1, which serves as a base plate; first and second stopper members 11-2 and 11-3, which are bonded together with the substrate 11-1 interposed therebetween and which serve as holding members; and first and second bases 11-4 and 11-5, which are respectively bonded to the stopper members 11-2 and 11-3. The stopper members 11-2 and 11-3 and the bases 11-4 and 11-5 are made of, for example, silicon or glass.

In this pressure sensor chip 11A, a low-differential-pressure diaphragm 1, which serves as a sensor diaphragm of a first type, and a high-differential-pressure diaphragm 2, which serves as a sensor diaphragm of a second type, are formed in the substrate 11-1 by dry etching.

Figure 2:
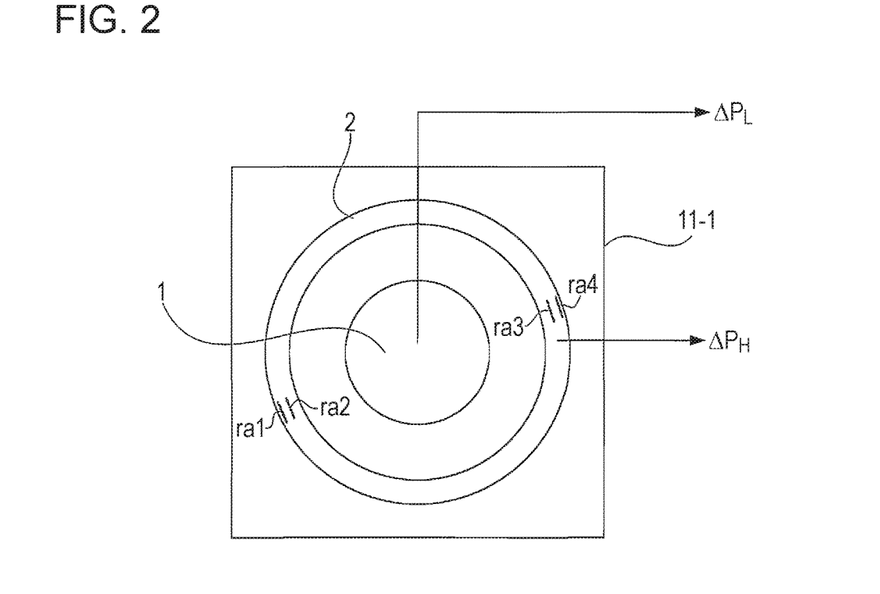
FIG. 2 is a diagram illustrating an example of the arrangement of a low-differential-pressure diaphragm and a high-differential-pressure diaphragm in a substrate of the pressure sensor chip according to Embodiment 1.

FIG. 2 illustrates an example of the arrangement of the low-differential-pressure diaphragm 1 and the high-differential-pressure diaphragm 2 in the substrate 11-1. In this example, the low-differential-pressure diaphragm 1, which is a circular diaphragm, is provided in a central region of the substrate 11-1, and the high-differential-pressure diaphragm 2, which is an annular diaphragm, are arranged so as to surround a periphery of the circular low-differential-pressure diaphragm 1.

In the present embodiment, the area of pressure-receiving surfaces of the high-differential-pressure diaphragm 2 is smaller than the area of pressure-receiving surfaces of the low-differential-pressure diaphragm 1. Accordingly, the pressure sensitivity of the high-differential-pressure diaphragm 2 is lower than the pressure sensitivity of the low-differential-pressure diaphragm 1.

The substrate 11-1, in which the low-differential-pressure diaphragm 1 and the high-differential-pressure diaphragm 2 are provided, is disposed between a stopper member 11-2 and a stopper member 11-3. More specifically, the stopper members 11-2 and 11-3 are bonded to one surface and the other surface of the substrate 11-1 so as to face each other with the low-differential-pressure diaphragm 1, which is formed in the central region of the substrate 11-1, and the high-differential-pressure diaphragm 2 disposed therebetween.

A chamber 3, which is a space (annular space) that faces one surface of the high-differential-pressure diaphragm 2, is provided in a peripheral portion of the stopper member 11-2. A chamber 4, which is a space (annular space) that faces the other surface of the high-differential-pressure diaphragm 2, is provided in a peripheral portion of the stopper member 11-3. Hereinafter, the chamber 3 provided in the stopper member 11-2 is referred to as a first chamber, and the chamber 4 provided in the stopper member 11-3 is referred to as a second chamber.

In the present embodiment, the width of the one surface of the high-differential-pressure diaphragm 2 that faces the first chamber 3, that is, the width W1 of the first chamber 3 that faces the one surface of the high-differential-pressure diaphragm 2, is equal to the width of the other surface of the high-differential-pressure diaphragm 2 that faces the second chamber 4, that is, the width W2 of the second chamber 4 that faces the other surface of the high-differential-pressure diaphragm 2.

A chamber 5, which is a space that faces one surface of the low-differential-pressure diaphragm 1, is provided in a central portion of the stopper member 11-2, and a chamber 6, which is a space that faces the other surface of the low-differential-pressure diaphragm 1, is provided in the central portion of the stopper member 11-3.

The chambers 5 and 6 are the spaces formed of recesses 11-2a and 11-3a that respectively face the one and the other surfaces of the low-differential-pressure diaphragm 1. The recesses 11-2a and 11-3a have curved surfaces (non-spherical surfaces) that follow the low-differential-pressure diaphragm 1 in the displaced state.

In the chambers 5 and 6, pressure introducing holes (pressure introduction holes) 11-2b and 11-3b are formed at the bottom portions of the recesses 11-2a and 11-3a. In addition, pressure introducing holes (pressure introduction holes) 11-4a and 11-5a are formed in the bases 11-4 and 11-5, respectively, at positions corresponding to the positions of the pressure introduction holes 11-2b and 11-3b in the stopper members 11-2 and 11-3.

In the pressure sensor chip 11A, the stopper member 11-2 has a non-bonding region SA1 provided therein. The non-bonding region SA1 is connected to the periphery of the pressure introduction hole 11-2b. The non-bonding region SA1 is provided as a region in which a first surface PL1 and a second surface PL2 are separated from each other and face each other along a portion of a plane PL that is parallel to the one surface of the substrate 11-1.

Figure 3:
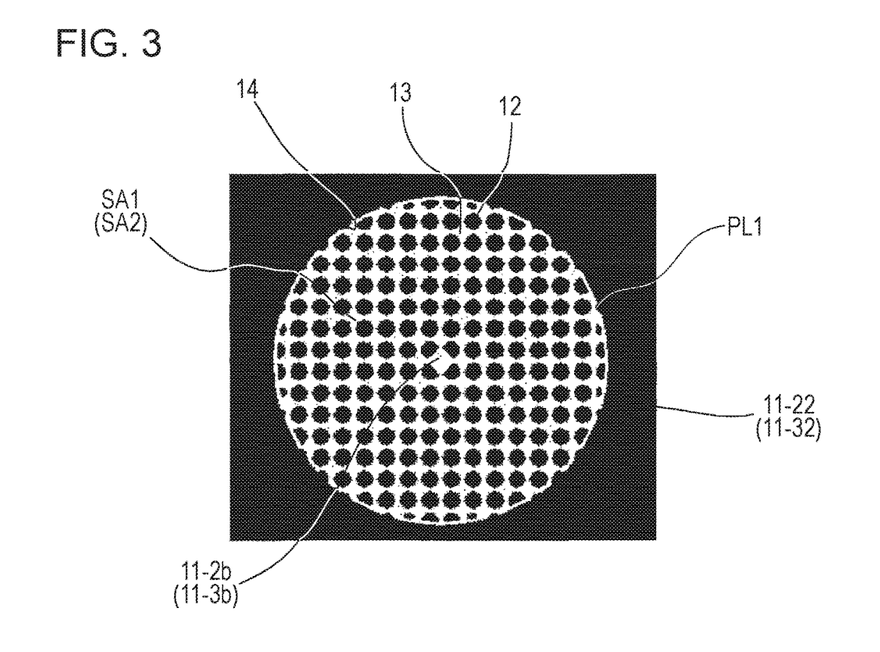
FIG. 3 is a plan view illustrating the shape of a plurality of protrusions that are discretely formed in non-bonding regions provided in stopper members included in the pressure sensor chip according to Embodiment 1.
Figure 4:
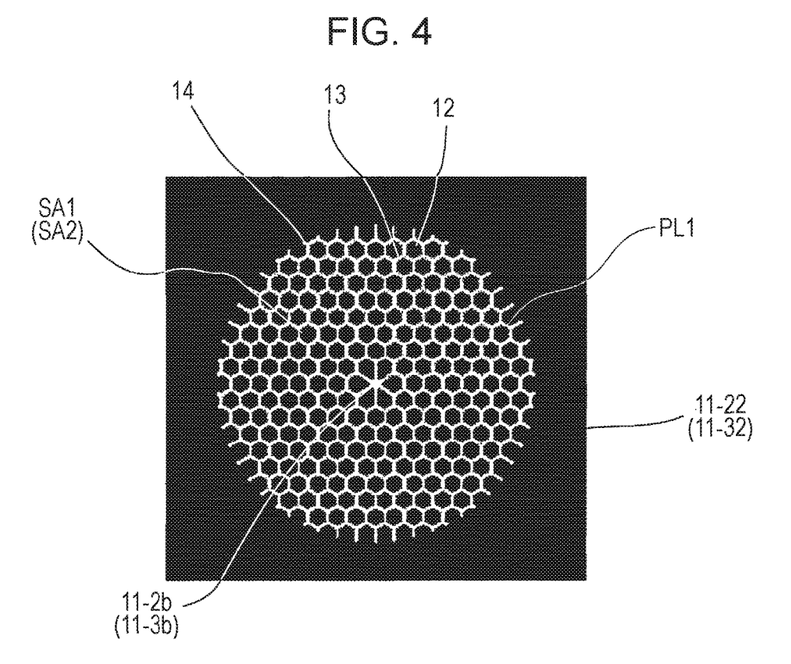
FIG. 4 is a plan view illustrating another example of the shape of a plurality of protrusions that are discretely formed in the non-bonding regions provided in the stopper members included in the pressure sensor chip according to Embodiment 1.

As illustrated in FIG. 3, a plurality of protrusions (columns) 12 are discretely formed on at least one of the first and second surfaces PL1 and PL2 that face each other in the non-bonding region SA1 (first surface PL1 in this example). Passages (grooves) 13 between the protrusions 12 serve as channels between the periphery of the pressure introduction hole 11-2b and a peripheral edge 14 of the non-bonding region SA1. Although the protrusions 12 have the shape of a circular column in this example, the protrusions 12 may instead have the shape of a hexagonal column as illustrated in FIG. 4.

In this example, the stopper member 11-2 is divided into two portions along the plane PL parallel to the one surface of the substrate 11-1. More specifically, the stopper member 11-2 is formed by bonding the two portions, which are a stopper member 11-21 and a stopper member 11-22, in a region SB1 excluding the non-bonding region SA1 along the plane PL including the non-bonding region SA1. Thus, the plane PL parallel to the one surface of the substrate 11-1 is divided into the non-bonding region SA1, which is connected to the periphery of the pressure introduction hole 11-2b, and the bonding region SB1, which is not connected to the periphery of the pressure introduction hole 11-2b.

Similar to the stopper member 11-2, the stopper member 11-3 also has a non-bonding region SA2 provided therein. The non-bonding region SA2 is connected to the periphery of the pressure introduction hole 11-3b. The non-bonding region SA2 is provided as a region in which a first surface PL1 and a second surface PL2 are separated from each other and face each other along a portion of a plane PL that is parallel to the other surface of the substrate 11-1.

Similar to the non-bonding region SA1 in the stopper member 11-2, a plurality of protrusions (columns) 12 are discretely formed on at least one of the first and second surfaces PL1 and PL2 that face each other in the non-bonding region SA2 (first surface PL1 in this example). Passages (grooves) 13 between the protrusions 12 serve as channels between the periphery of the pressure introduction hole 11-3b and a peripheral edge 14 of the non-bonding region SA2. Although the protrusions 12 have the shape of a circular column in this example, the protrusions 12 may instead have the shape of a hexagonal column.

In this example, the stopper member 11-3 is divided into two portions along the plane PL parallel to the other surface of the substrate 11-1. More specifically, the stopper member 11-3 is formed by bonding the two portions, which are a stopper member 11-31 and a stopper member 11-32, in a region SB2 excluding the non-bonding region SA2 along the plane PL including the non-bonding region SA2. Thus, the plane PL parallel to the other surface of the substrate 11-1 is divided into the non-bonding region SA2, which is connected to the periphery of the pressure introduction hole 11-3b, and the bonding region SB2, which is not connected to the periphery of the pressure introduction hole 11-3b.

In the stopper member 11-2, the first chamber 3 is formed in the stopper member 11-21 together with the recess 11-2a. Pressure introducing holes (pressure introduction holes) 11-2c are formed between the first chamber 3 and the non-bonding region SA1. In the stopper member 11-3, the second chamber 4 is formed in the stopper member 11-31 together with the recess 11-3a. Pressure introducing holes (pressure introduction holes) 11-3c are formed between the second chamber 4 and the non-bonding region SA2. In this example, as illustrated in FIG. 1, the pressure introduction holes 11-2c and 11-3c are provided at two locations, which are on the left and right sides of the pressure introduction holes 11-2b and 11-3b in sectional view.

In the pressure sensor chip 11A, a measurement pressure Pa is transmitted into the chamber 5 through the pressure introduction hole 11-2b in the stopper member 11-2, and a measurement pressure Pb is transmitted into the chamber 6 through the pressure introduction hole 11-3b provided in the stopper member 11-3. Thus, the low-differential-pressure diaphragm 1 is displaced by an amount corresponding to the difference between the measurement pressure Pa transmitted into the chamber 5 and the measurement pressure Pb transmitted into the chamber 6. The stress generated at an edge portion of the low-differential-pressure diaphragm 1 due to the displacement of the low-differential-pressure diaphragm 1 is detected as a differential pressure ΔP based on changes in the resistances of piezoresistors (not shown) provided on the edge portion of the low-differential-pressure diaphragm 1.

In the pressure sensor chip 11A, the measurement pressure Pa is also transmitted to the non-bonding region SA1 provided in the stopper member 11-2 through the pressure introduction hole 11-2b, and the measurement pressure Pa that has been transmitted to the non-bonding region SA1 is transmitted to the first chamber 3, which faces the one surface of the high-differential-pressure diaphragm 2, through the pressure introduction holes 11-2c.

The measurement pressure Pb is also transmitted to the non-bonding region SA2 provided in the stopper member 11-3 through the pressure introduction hole 11-3b, and the measurement pressure Pb that has been transmitted to the non-bonding region SA2 is transmitted to the second chamber 4, which faces the other surface of the high-differential-pressure diaphragm 2, through the pressure introduction holes 11-3c.

Accordingly, the high-differential-pressure diaphragm 2 is displaced by an amount corresponding to the difference between the measurement pressure Pa transmitted into the chamber 3 and the measurement pressure Pb transmitted into the chamber 4. The stress generated at an edge portion of the high-differential-pressure diaphragm 2 due to the displacement of the high-differential-pressure diaphragm 2 is detected as a differential pressure ΔP based on changes in the resistances of piezoresistors ra1 to ra4 illustrated in FIG. 2, which are provided on the edge portion of the high-differential-pressure diaphragm 2.

In the present embodiment, the pressure sensitivity of the high-differential-pressure diaphragm 2 is lower than the pressure sensitivity of the low-differential-pressure diaphragm 1. Therefore, when a low differential pressure is applied, although the low-differential-pressure diaphragm 1 is displaced by an amount corresponding to the differential pressure ΔP, the high-differential-pressure diaphragm 2 is not displaced by an amount corresponding to the differential pressure ΔP. When a high differential pressure is applied, the low-differential-pressure diaphragm 1 is prevented from being excessively displaced by the recesses 11-2a and 11-3a in the stopper members 11-2 and 11-3, so that the low-differential-pressure diaphragm 1 is not displaced by an amount corresponding to the differential pressure ΔP. However, the high-differential-pressure diaphragm 2 is displaced by an amount corresponding to the differential pressure ΔP.

Thus, in the present embodiment, since the pressure sensitivity of the high-differential-pressure diaphragm 2 is lower than the pressure sensitivity of the low-differential-pressure diaphragm 1, the pressure difference ΔP obtained by the low-differential-pressure diaphragm 1 is output as a low-range differential pressure $\Delta P_L$, and the pressure difference ΔP obtained by the high-differential-pressure diaphragm 2 is output as a high-range pressure difference $\Delta P_H$.

Accordingly, when a low differential pressure is applied, the low-differential-pressure diaphragm (sensor diaphragm of the first type) 1 is used to accurately measure the difference between the pressures applied to the low-differential-pressure diaphragm 1. When a high differential pressure is applied, the high-differential-pressure diaphragm (sensor diaphragm of the second type) 2 is used to accurately measure the difference between the pressures applied to the high-differential-pressure diaphragm 2. Thus, multiple differential-pressure measurement ranges are provided.

Although an excessive pressure is applied to the low-differential-pressure diaphragm 1 when a high differential pressure is applied, the low-differential-pressure diaphragm 1 does not break because the recesses 11-2a and 11-3a in the stopper members 11-2 and 11-3 prevent the low-differential-pressure diaphragm 1 from being excessively displaced.

For example, assume that, in the pressure sensor chip 11A, the measurement pressure Pb is the high-pressure-side measurement pressure and the measurement pressure Pa is the low-pressure-side measurement pressure. In this case, when the high-pressure-side measurement pressure Pb is applied to the other surface of the low-differential-pressure diaphragm 1, the low-differential-pressure diaphragm 1 is bent toward the stopper member 11-2. At this time, the stopper member 11-3 receives a force in a direction opposite to the direction in which the low-differential-pressure diaphragm 1 is bent, and tries to form an opening at a diaphragm edge, for example, at locations indicated by points G in FIG. 1. In the following description, the direction in which the low-differential-pressure diaphragm 1 is bent in FIG. 1 is referred to as the upward direction, and the direction opposite to the direction in which the low-differential-pressure diaphragm 1 is bent is referred to as the downward direction.

In this case, in the present embodiment, since the measurement pressure Pb is transmitted to the non-bonding region SA2 provided in the stopper member 11-3 through the pressure introduction hole 11-3b, the non-bonding region SA2 provides a pressure-receiving surface that receives the measurement pressure Pb and reduces the downward force applied to the stopper member 11-3, so that no opening is formed at the diaphragm edge. Accordingly, the stress generated because the low-differential-pressure diaphragm 1 is restrained is reduced, and stress concentration does not occur at the diaphragm edge.

In the pressure sensor chip 11A, the non-bonding region SA2 exerts a greater effect when the excessive pressure increases after the low-differential-pressure diaphragm 1 has come into contact with the bottom of the recess 11-2a in the stopper member 11-2. This will be described in detail with reference to FIG. 5.

Figure 5:
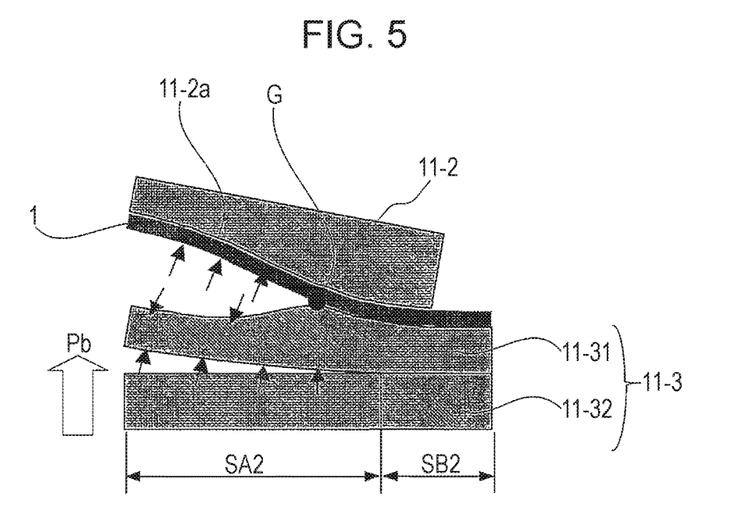
FIG. 5 is a diagram illustrating the state after the low-differential-pressure diaphragm has come into contact with the bottom of a recess in a stopper member included in the pressure sensor chip according to Embodiment 1.

FIG. 5 illustrates the state after the low-differential-pressure diaphragm 1 has come into contact with the bottom of the recess 11-2a in the stopper member 11-2. When an excessive pressure is applied to the other surface of the low-differential-pressure diaphragm 1, the low-differential-pressure diaphragm 1 is bent toward the stopper member 11-2, and comes into contact with the bottom of the recess 11-2a in the stopper member 11-2. When the excessive pressure increases after the low-differential-pressure diaphragm 1 has come into contact with the bottom of the recess 11-2a, the stopper member 11-3 is deformed by the downward force applied to the stopper member 11-3, and tries to form an opening at the diaphragm edge.

In this case, according to the present embodiment, the excessive pressure is also transmitted to the non-bonding region SA2, which is provided in the stopper member 11-3, through the pressure introduction hole 11-3b uniformly along the passages 13 between the protrusions 12. Accordingly, the non-bonding region SA2 provides a pressure-receiving surface that receives the excessive pressure, and applies an upward force to the stopper member 11-31. Owing to this force, deformation of the stopper member 11-31 is suppressed, or the stopper member 11-31 is deformed in the opposite direction. In the example illustrated in FIG. 5, the stopper member 11-31 is deformed in the upward direction so as to follow the upward deformation of the low-differential-pressure diaphragm 1.

Accordingly, even when the excessive pressure increases after the low-differential-pressure diaphragm 1 has come into contact with the bottom of the recess 11-2a in the stopper member 11-2, no opening is formed at the diaphragm edge, and stress concentration does not occur at the diaphragm edge. Therefore, an expected withstand pressure can be obtained. Thus, the low-differential-pressure diaphragm 1 is prevented from being broken during the measurement of the high-range differential pressure $\Delta P_H$ by the high-differential-pressure diaphragm 2.

In the present embodiment, the area of the non-bonding region SA2 provided in the stopper member 11-3, that is, the pressure-receiving area in the stopper member 11-3, is preferably sufficiently greater than the pressure-receiving area of the recess 11-3a in the stopper member 11-3 so that the deformation of the stopper member 11-3 in the downward direction can be suppressed or the stopper member 11-3 can be deformed in the opposite direction.

In the present embodiment, the protrusions 12 are discretely formed on the first surface PL1 in the non-bonding region SA2 provided in the stopper member 11-3. However, the protrusions 12 may instead be discretely formed on the second surface PL2. Alternatively, the protrusions 12 may instead be formed on both the first surface PL1 and the second surface PL2.

In the above-described example, it is assumed that the measurement pressure Pb is the high-pressure-side measurement pressure and the measurement pressure Pa is the low-pressure-side measurement pressure. In the case where the measurement pressure Pa is the high-pressure-side measurement pressure and the measurement pressure Pb is the low-pressure-side measurement pressure, the non-bonding region SA1 in the stopper member 11-2 serves the same function as the function of the non-bonding region SA2 in the stopper member 11-3. Accordingly, an operation similar to the above-described operation is performed.

In the present embodiment, since the protrusions 12 are discretely formed on the first surface PL1 in the each of non-bonding regions SA1 and SA2 provided in the stopper members 11-2 and 11-3, and since the passages 13 between the protrusions 12 serve as channels between the peripheries of the pressure introduction holes 11-2b and 11-3b and the peripheral edges 14 of the non-bonding regions SA1 and SA2, a commonly used pressure transmitting medium, such as oil, can be easily enclosed. Furthermore, by reducing the transmission resistance of the pressure transmitting medium to be enclosed, the influence of malfunction due to a difference in transmission speed can be eliminated. With regard to an application of pressure from the opposite side, sufficient withstand pressure can be ensured by optimizing the area of the protrusions 12.

[Embodiment 2]

Figure 6:
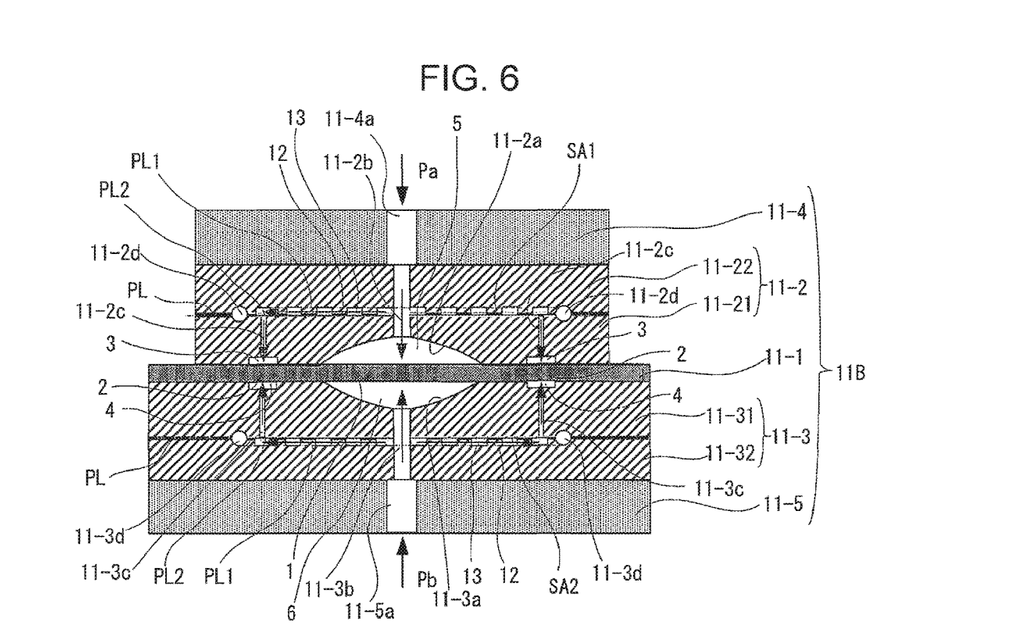
FIG. 6 is a schematic diagram illustrating a pressure sensor chip according to a second embodiment of the present invention (Embodiment 2).

FIG. 6 is a schematic diagram illustrating a pressure sensor chip according to a second embodiment of the present invention (Embodiment 2). A pressure sensor chip 11B according to Embodiment 2 includes annular grooves 11-2d and 11-3d, which are respectively formed in the stopper members 11-2 and 11-3. The annular grooves 11-2d and 11-3d are respectively connected to the non-bonding regions SA1 and SA2 and are formed so as to project in the thickness direction of the stopper members 11-2 and 11-3. The annular grooves 11-2d and 11-3d are continuous grooves that are not divided at discrete locations, and the cross sections thereof preferably have a large diameter.

Figure 7:
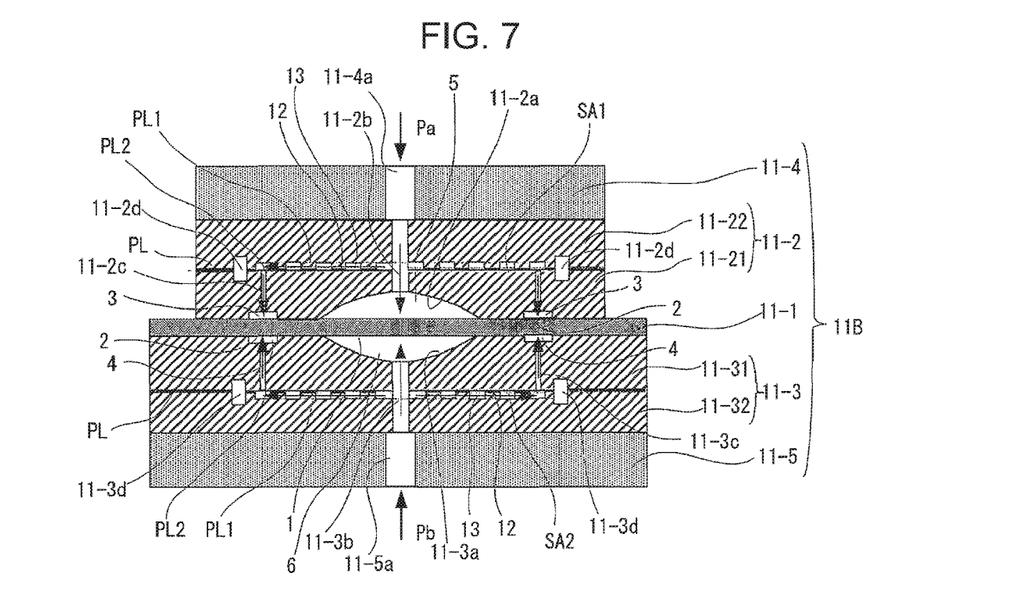
FIG. 7 is a diagram illustrating an example in which annular grooves formed in stopper members included in the pressure sensor chip according to Embodiment 2 are slit-shaped (has a rectangular cross section).
Figure 8:
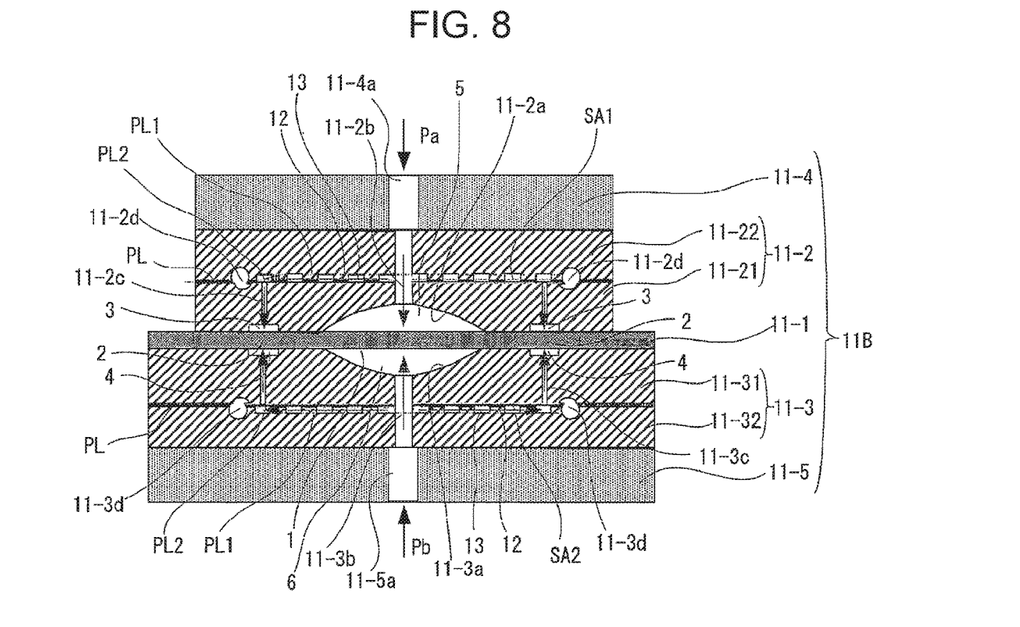
FIG. 8 is a diagram illustrating an example in which annular grooves formed in stopper members included in the pressure sensor chip according to Embodiment 2 are shaped such that a groove larger than a semicircular groove and a groove smaller than a semicircular groove are shifted from each other.

In the example illustrated in FIG. 6, the cross sections of the annular grooves 11-2d and 11-3d along a plane perpendicular to the non-bonding regions SA1 and SA2 are circular. However, the cross-sectional shapes are not limited to circular, and may instead be, for example, a slit-shape (rectangular) as illustrated in FIG. 7, or a shape illustrated in FIG. 8 in which a major-arc-shaped or semicircular groove and a minor-arc-shaped or semicircular groove are combined such that the grooves are shifted from each other.

Figure 9:
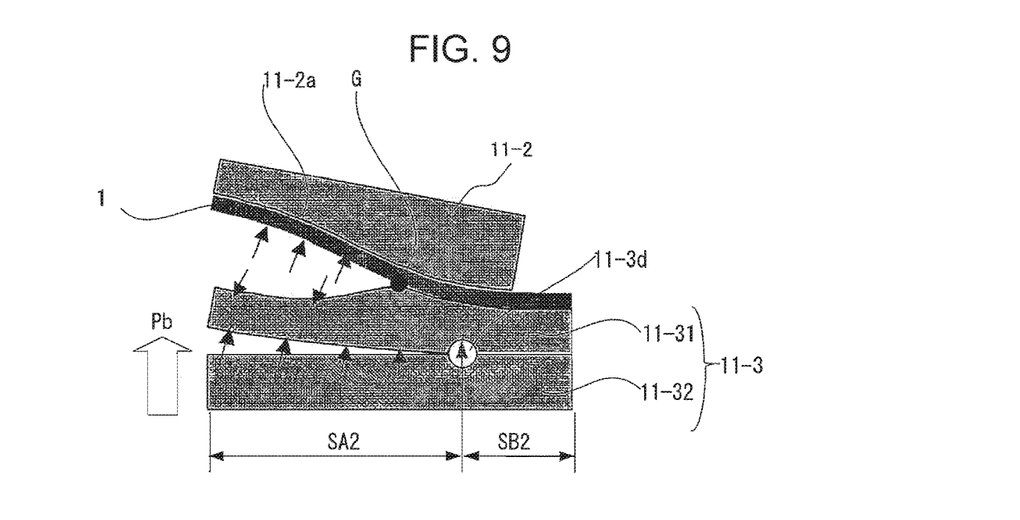
FIG. 9 is a diagram illustrating the state after a low-differential-pressure diaphragm has come into contact with the bottom of a recess in a stopper member included in the pressure sensor chip according to Embodiment 2.

FIG. 9 illustrates the state after the low-differential-pressure diaphragm 1 has come into contact with the bottom of the recess 11-2a in the stopper member 11-2 included in the pressure sensor chip 11B illustrated in FIG. 6. When the annular grooves 11-2d and 11-3d are formed, the stress is distributed in the annular grooves 11-2d and 11-3d. Therefore, the withstand pressure can be further increased.

[Embodiment 3]

Figure 10:
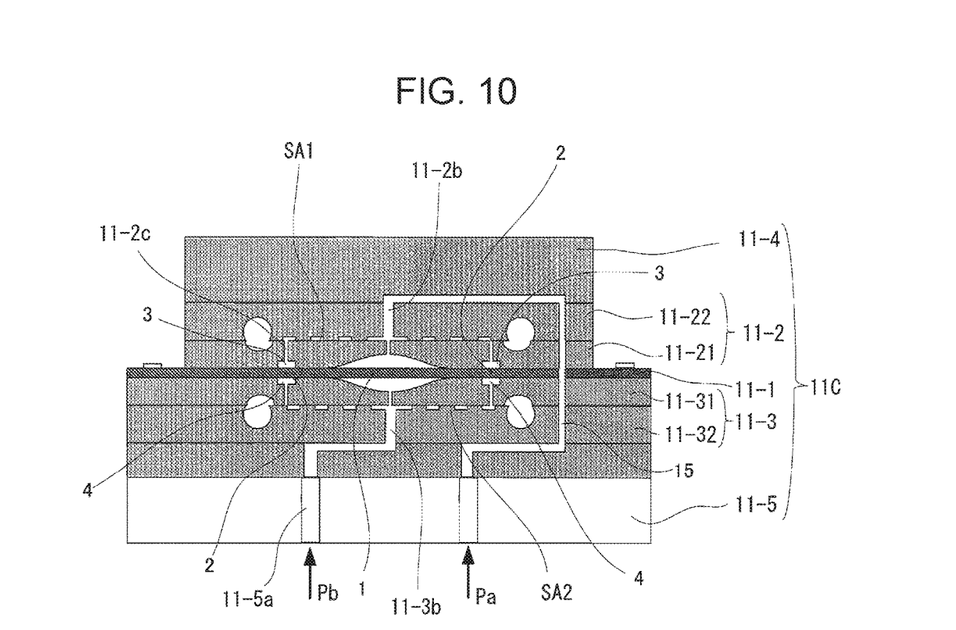
FIG. 10 is a schematic diagram illustrating a pressure sensor chip according to a third embodiment of the present invention (Embodiment 3).

FIG. 10 is a schematic diagram illustrating a pressure sensor chip according to a third embodiment of the present invention (Embodiment 3). In a pressure sensor chip 11C according to Embodiment 3, which is a modification of the pressure sensor chip 11B according to Embodiment 2, the measurement pressures Pa and Pb are introduced in the same direction.

In this example, the measurement pressure Pa is introduced in the same direction as the direction in which the measurement pressure Pb is introduced. More specifically, in the pressure sensor chip 11C according to Embodiment 3, a pressure introduction hole 15, which is formed so as to extend through the base 11-5, the stopper member 11-3, the substrate 11-1, and the stopper member 11-2, is connected to the pressure introduction hole 11-2b in the stopper member 11-2 through the base 11-4. Thus, the measurement pressure Pa, which is introduced in the same direction as the direction in which the measurement pressure Pb is introduced, is transmitted to the one surface of the low-differential-pressure diaphragm 1 and the one surface of the high-differential-pressure diaphragm 2.

Figure 11:
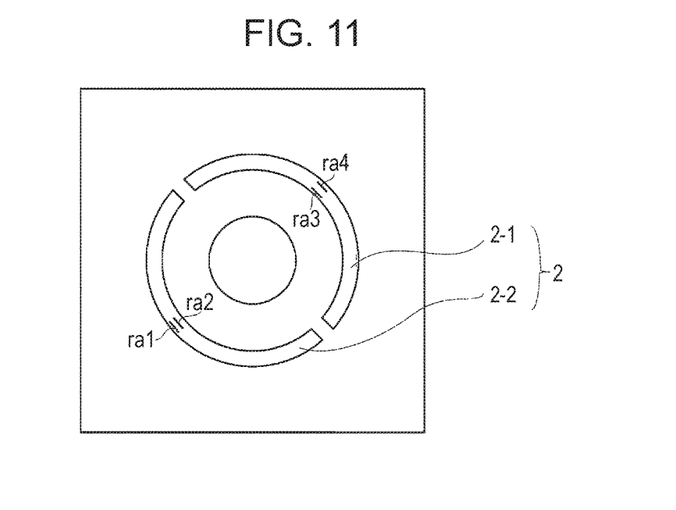
FIG. 11 is a diagram illustrating another exemplary structure of a high-differential-pressure diaphragm.

In the above-described embodiments, the high-differential-pressure diaphragm 2 is an annular diaphragm. However, the shape of the high-differential-pressure diaphragm 2 is not limited to this. For example, as illustrated in FIG. 11, an annular diaphragm may be divided into two diaphragms 2-1 and 2-2 that surround the low-differential-pressure diaphragm 1, and the high-differential-pressure diaphragm 2 may be constituted by the diaphragms 2-1 and 2-2.

Figure 12:
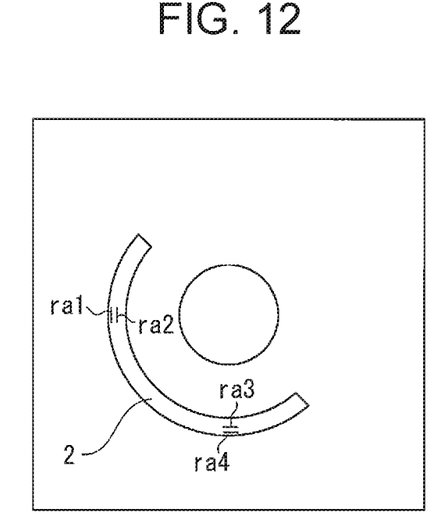
FIG. 12 is a diagram illustrating another exemplary structure of a high-differential-pressure diaphragm.

Alternatively, as illustrated in FIG. 12, a semicircular-strip-shaped (for example, C-shaped) diaphragm may be provided at a portion of the periphery of the low-differential-pressure diaphragm 1, and the semicircular-strip-shaped diaphragm may be used as the high-differential-pressure diaphragm 2.

Figure 13:
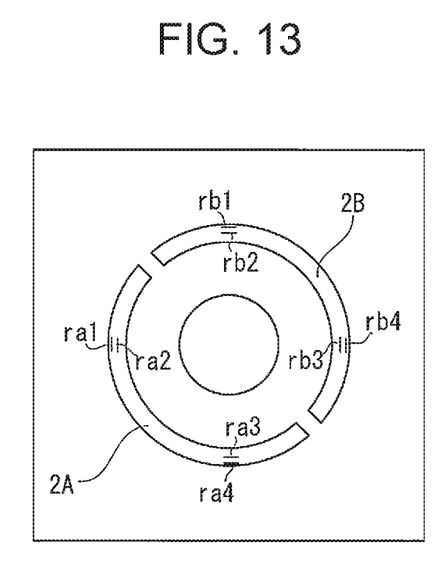
FIG. 13 is a diagram illustrating an example in which a first high-differential-pressure diaphragm and a second high-differential-pressure diaphragm are provided.

Alternatively, as illustrated in FIG. 13, semicircular-strip-shaped diaphragms may be arranged so as to face each other with the low-differential-pressure diaphragm 1 provided therebetween so that one of the semicircular-strip-shaped diaphragms serves as a first high-differential-pressure diaphragm 2A and the other semicircular-strip-shaped diaphragm serves as a second high-differential-pressure diaphragm 2B. In this case, the high-differential-pressure measurement range may be divided into multiple ranges by setting the pressure sensitivity of the second high-differential-pressure diaphragm 2B so as to be lower than the pressure sensitivity of the first high-differential-pressure diaphragm 2A. Although the high-differential-pressure measurement range is divided into two ranges in this example, the number of ranges can be further increased by reducing the pressure sensitivity of high-differential-pressure diaphragms stepwise.

Figure 14:
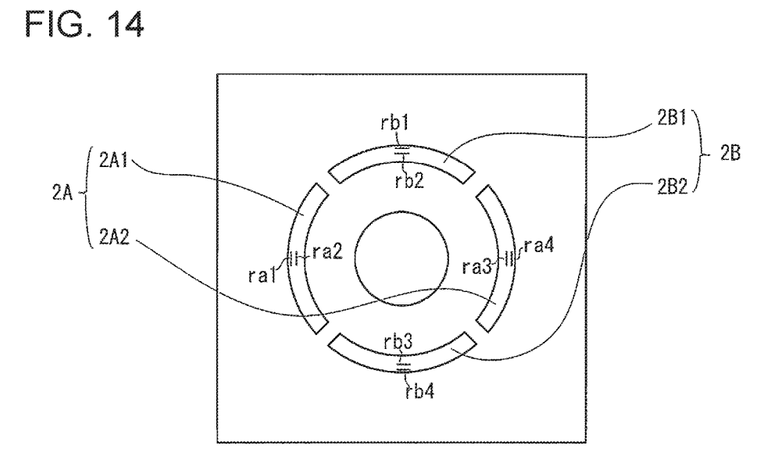
FIG. 14 is a diagram illustrating another exemplary structure in which a first high-differential-pressure diaphragm and a second high-differential-pressure diaphragm are provided.
Figure 15:
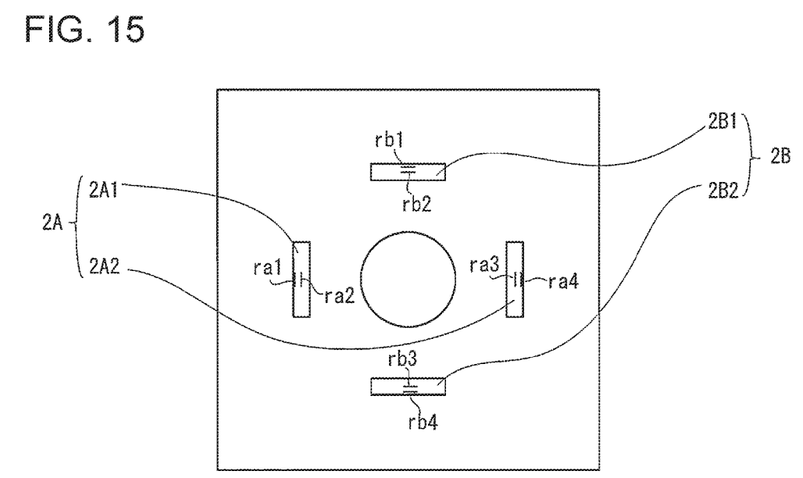
FIG. 15 is a diagram illustrating another exemplary structure in which a first high-differential-pressure diaphragm and a second high-differential-pressure diaphragm are provided.

Furthermore, as illustrated in FIGS. 14 and 15, a first high-differential-pressure diaphragm 2A may be formed of arc-shaped or rectangular diaphragms 2A1 and 2A2 that face each other with the low-differential-pressure diaphragm 1 disposed therebetween, and a second high-differential-pressure diaphragm 2B may be formed of arc-shaped or rectangular diaphragms 2B1 and 2B2 that face each other with the low-differential-pressure diaphragm 1 disposed therebetween at locations shifted from the high-differential-pressure diaphragm 2A by 90 degrees.

[Embodiment 4]

Figure 16:
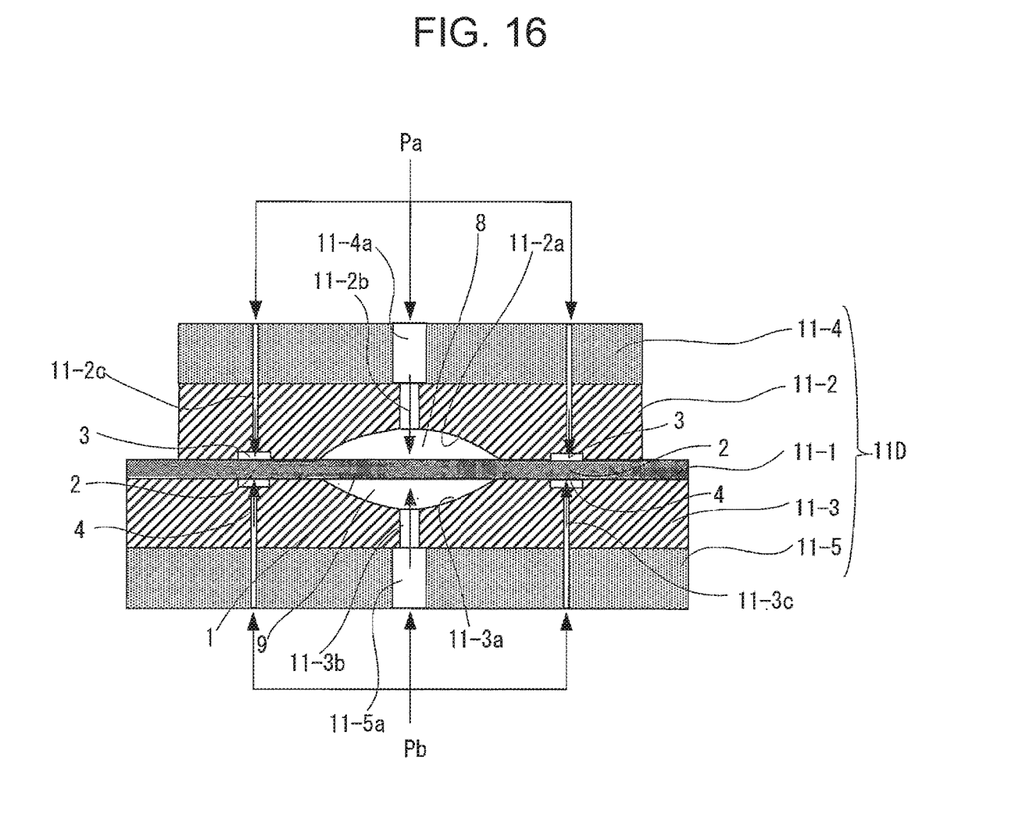
FIG. 16 is a schematic diagram illustrating a pressure sensor chip according to a fourth embodiment of the present invention (Embodiment 4).

FIG. 16 is a schematic diagram illustrating a pressure sensor chip according to a fourth embodiment of the present invention (Embodiment 4).

In the above-described embodiments, the non-bonding regions SA1 and SA2 are respectively provided in the stopper members 11-2 and 11-3, and the measurement pressures Pa and Pb are transmitted to the high-differential-pressure diaphragm 2 through the non-bonding regions SA1 and SA2 along branched paths. However, as in a pressure sensor chip 11D according to Embodiment 4 illustrated in FIG. 16, the paths along which the measurement pressures Pa and Pb are transmitted to the one and the other surfaces of the high-differential-pressure diaphragm 2 may be branched outside the pressure sensor chip 11D.

In addition, referring to FIG. 16, the measurement pressure Pa may be transmitted to the other surface of the annular high-differential-pressure diaphragm 2 through the substrate 11-1, and the measurement pressure Pb may be transmitted to the one surface of the annular high-differential-pressure diaphragm 2 through the substrate 11-1.

In the above-described embodiments, a plurality of protrusions (columns) 12 are discretely formed in the non-bonding regions SA1 and SA2 provided in the stopper members 11-2 and 11-3, and passages (grooves) 13 between the protrusions 12 serve as channels between the peripheries of the pressure introduction holes 11-2b and 11-3b and the peripheral edges 14 of the non-bonding regions SA1 and SA2. However, the channels are not limited to those defined by the discretely formed protrusions 12, and simple slit-shaped gaps may instead be used as the channels.

[Other Embodiments]

Although the present invention has been described by referring to embodiments, the present invention is not limited to the above-described embodiments. Various modifications that are understandable by a person skilled in the art can be made on the structure and details of the present invention within the technical idea of the present invention. In addition, the embodiments may be implemented in any combination unless they contradict each other.

INDUSTRIAL APPLICABILITY

The pressure sensor chip according to the present invention is applicable to various uses, and may be used as, for example, an industrial differential pressure sensor.

REFERENCE SIGNS LIST 1 low-differential-pressure diaphragm, 2 high-differential-pressure diaphragm, 3 first chamber, 4 second chamber, 11-1 substrate, 11-2 (11-21, 11-22), 11-3 (11-31, 11-32) stopper member, 11-2a, 11-3a recess, 11-2b, 11-2c, 11-3b, 11-3c pressure introduction hole, 11-4, 11-5 base, 12 protrusion (column), 13 passage (groove), 14 peripheral edge, SA non-bonding region, SB bonding region, ra1 to ra4, rb1 to rb4 piezoresistor.

The invention claimed is:

1. A pressure sensor chip comprising:
   a substrate;
   a sensor diaphragm of a first type that is formed in a central region of the substrate and that outputs a signal corresponding to a difference between pressures applied to one surface and the other surface of the sensor diaphragm of the first type;
   a sensor diaphragm of a second type that is formed on the substrate so as to be apart from the sensor diaphragm of the first type, the sensor diaphragm of the second type outputting a signal corresponding to a difference between pressures applied to one surface and the other surface of the sensor diaphragm of the second type;

first and second holding members that are bonded to one surface and the other surface of the substrate in such a manner that the first and second holding members face each other with the sensor diaphragm of the second type disposed therebetween;

a first pressure introduction hole provided in the first holding member to transmit a first measurement pressure to the one surface of the sensor diaphragm of the first type;

a second pressure introduction hole provided in the second holding member to transmit a second measurement pressure to the other surface of the sensor diaphragm of the first type;

a first recess provided in the first holding member to prevent the sensor diaphragm of the first type from being excessively displaced when an excessive pressure is applied to the sensor diaphragm of the first type;

a second recess provided in the second holding member to prevent the sensor diaphragm of the first type from being excessively displaced when an excessive pressure is applied to the sensor diaphragm of the first type;

a first chamber provided in a peripheral portion of the first holding member as a space that faces the one surface of the sensor diaphragm of the second type, one of the first measurement pressure for the one surface of the sensor diaphragm of the first type and the second measurement pressure for the other surface of the sensor diaphragm of the first type being transmitted to the first chamber; and a second chamber provided in a peripheral portion of the second holding member as a space that faces the other surface of the sensor diaphragm of the second type, the other of the first measurement pressure for the one surface of the sensor diaphragm of the first type and the second measurement pressure for the other surface of the sensor diaphragm of the first type being transmitted to the second chamber.

2. The pressure sensor chip according to claim 1, wherein the sensor diaphragm of the second type is an annular diaphragm that extends continuously so as to surround a periphery of the sensor diaphragm of the first type.

3. The pressure sensor chip according to claim 1, wherein the sensor diaphragm of the second type is an annular diaphragm that is divided into portions arranged so as to surround a periphery of the sensor diaphragm of the first type.

4. The pressure sensor chip according to claim 1, wherein the sensor diaphragm of the second type is a diaphragm provided at a portion of a periphery of the sensor diaphragm of the first type.

5. The pressure sensor chip according to claim 1, wherein a pressure sensitivity of the sensor diaphragm of the second type is lower than a pressure sensitivity of the sensor diaphragm of the first type.

6. The pressure sensor chip according to claim 1, wherein the sensor diaphragm of the second type is provided in a plurality, and wherein the plurality of sensor diaphragms of the second type each have a pressure sensitivity lower than a pressure sensitivity of the sensor diaphragm of the first type, and the pressure sensitivity of the sensor diaphragms of the second type decreases stepwise.

7. The pressure sensor chip according to claim 1, wherein the first holding member includes a non-bonding region provided inside the first holding member and connected to a periphery of the first pressure introduction hole, wherein the non-bonding region in the first holding member is a region in which a first surface and a second surface face each other along a portion of a plane parallel to the one surface of the substrate, wherein a plurality of protrusions are discretely formed on at least one of the first surface and the second surface that face each other in the non-bonding region in the first holding member, wherein passages between the plurality of protrusions formed in the first holding member form channels between the periphery of the first pressure introduction hole and a peripheral edge of the non-bonding region, wherein the second holding member includes a non-bonding region provided inside the second holding member and connected to a periphery of the second pressure introduction hole, wherein the non-bonding region in the second holding member is a region in which a first surface and a second surface face each other along a portion of a plane parallel to the other surface of the substrate, wherein a plurality of protrusions are discretely formed on at least one of the first surface and the second surface that face each other in the non-bonding region in the second holding member, and wherein passages between the plurality of protrusions formed in the second holding member form channels between the periphery of the second pressure introduction hole and a peripheral edge of the non-bonding region.

* * * * *

UNITED STATES PATENT AND TRADEMARK OFFICE
CERTIFICATE OF CORRECTION

| | | |
|---|---|---|
| PATENT NO. | : 10,352,803 B2 | Page 1 of 1 |
| APPLICATION NO. | : 15/300578 | |
| DATED | : July 16, 2019 | |
| INVENTOR(S) | : Tomohisa Tokuda | |

It is certified that error appears in the above-identified patent and that said Letters Patent is hereby corrected as shown below:

On the Title Page

Item (30), the Foreign Application Priority Data has been omitted. Item (30) should read:
-- (30)  Foreign Application Priority Data
Mar. 31, 2014   (JP)...................2014-071072 --

Signed and Sealed this
Twenty-first Day of April, 2020

Andrei Iancu
*Director of the United States Patent and Trademark Office*